United States Patent
Koike et al.

[11] Patent Number: 6,032,570
[45] Date of Patent: Mar. 7, 2000

[54] COMPOSITE PISTON FOR MACHINE

[75] Inventors: Toshikatsu Koike; Hirotaka Kurita; Hiroshi Yamagata, all of Iwata, Japan

[73] Assignee: Yamaha Hatsudoki Kabushiki Kaisha, Iwata, Japan

[21] Appl. No.: 09/058,533

[22] Filed: Apr. 10, 1998

[51] Int. Cl.[7] .................................................. F16J 1/04
[52] U.S. Cl. ........................................................ 92/222
[58] Field of Search ................. 92/222, 224; 29/888.04, 29/888.042, 888.044, 888.047, 888.049

[56] References Cited

U.S. PATENT DOCUMENTS

| | | | |
|---|---|---|---|
| 1,508,861 | 9/1924 | Taub ............................................ | 92/224 |
| 1,979,498 | 11/1934 | Short ........................................ | 92/224 X |
| 2,261,405 | 11/1941 | Nicole ....................................... | 92/227 |
| 2,707,136 | 4/1955 | Fahlman . | |
| 2,713,526 | 7/1955 | Zollner ...................................... | 92/222 |
| 3,152,523 | 10/1964 | Whitfield et al. ...................... | 92/224 X |
| 3,868,250 | 2/1975 | Zimmermann ......................... | 92/222 X |
| 4,297,976 | 11/1981 | Bruni et al. ............................ | 92/169.1 X |
| 4,364,159 | 12/1982 | Holcombe ........................... | 29/888.044 X |
| 4,434,014 | 2/1984 | Smith . | |
| 4,535,683 | 8/1985 | Dworak et al. ....................... | 92/224 |
| 4,548,126 | 10/1985 | Donomoto et al. .................. | 92/222 X |
| 4,711,823 | 12/1987 | Shiina ..................................... | 428/547 |
| 4,727,795 | 3/1988 | Murray et al. ........................ | 92/224 X |
| 4,735,128 | 4/1988 | Mahrus et al. ....................... | 92/224 X |
| 4,959,276 | 9/1990 | Hagiwara et al. ................... | 428/614 |
| 4,972,898 | 11/1990 | Cole ..................................... | 164/98 |

FOREIGN PATENT DOCUMENTS

| | | |
|---|---|---|
| 0153 473 A2 | 12/1984 | European Pat. Off. . |
| 672992 | 1/1930 | France ..................................... 92/224 |
| 1226350 | 7/1960 | France . |
| 3719121 A1 | 12/1988 | Germany . |
| 3822031 A1 | 1/1990 | Germany . |
| 63-126661 | 5/1988 | Japan . |
| 63-132743 | 6/1988 | Japan . |
| 1-180927 | 7/1989 | Japan . |
| 2-233858 | 9/1990 | Japan . |
| 9-76042 | 3/1997 | Japan . |
| 449 719 | 1/1971 | Switzerland . |

*Primary Examiner*—John E. Ryznic
*Attorney, Agent, or Firm*—Knobbe, Martens, Olson & Bear LLP

[57] ABSTRACT

A composite piston and method for forming such a piston for a reciprocating machine such as an internal combustion engine. A blank is formed from a pair of dissimilar alloys, one of which has substantially greater properties such as strength or abrasion resistance. The blank is forged into a piston in such a way that the two materials are bonded together in the forging process. The higher strength and/or abrasion resistance material forms at least a part of the outer surface of the piston in areas where the better properties are required. The other material backs up the higher strength or hardness material in necessary areas so as to provide an integral structure that has lightweight, low costs and nevertheless the desired properties. Various physical constructions and forming operations are disclosed.

27 Claims, 9 Drawing Sheets

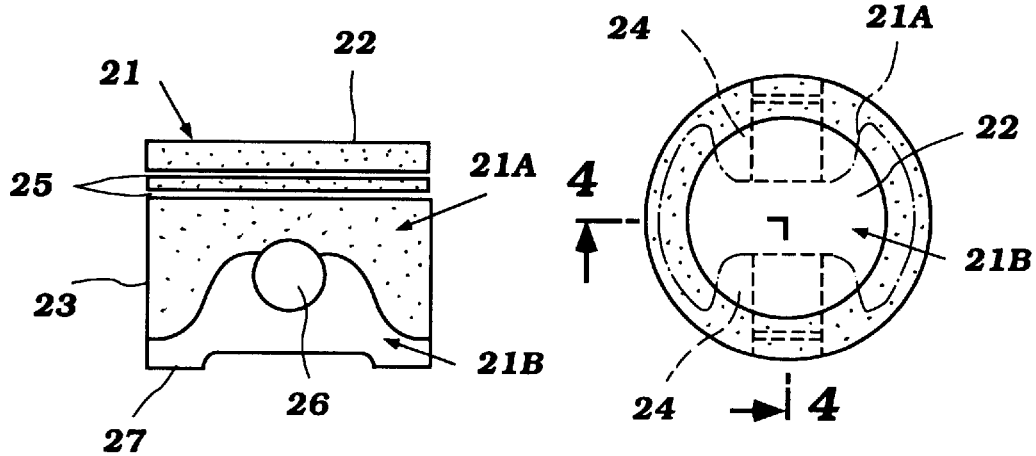
Figure 2       Figure 3
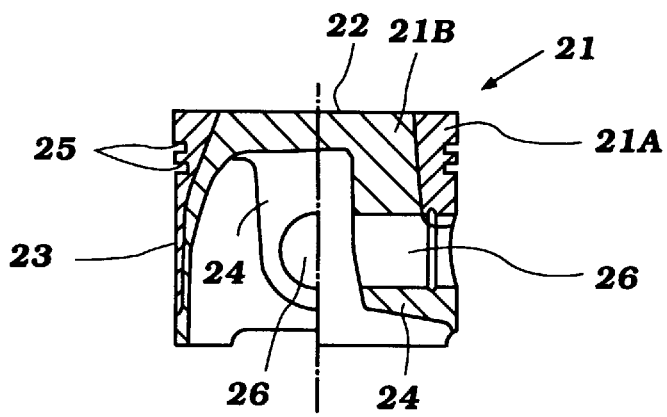
Figure 4
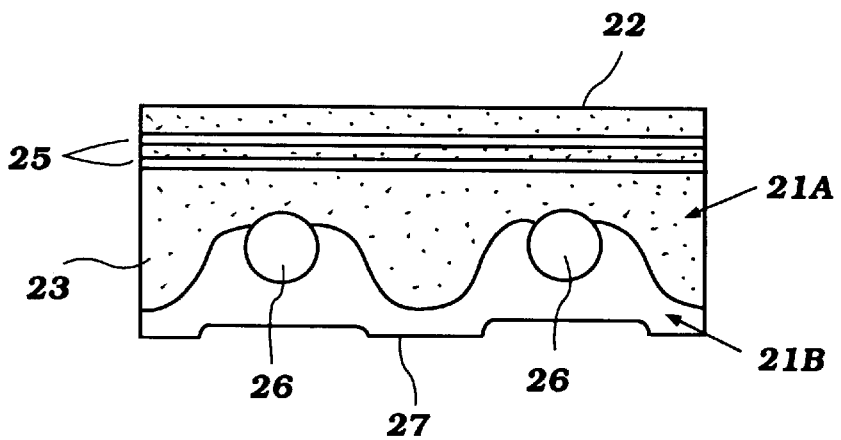
Figure 5

6,032,570

COMPOSITE PISTON FOR MACHINE

BACKGROUND OF THE INVENTION

This invention relates to a piston for a machine such as an internal combustion engine and to a method for manufacturing such a piston.

The piston in a reciprocating machine is obviously a very critical part of the mechanism. This is particularly true with internal combustion engines in as much as the piston is the part of the engine that receives the explosive force from the combustion and transmits it through the connecting rod to a crankshaft for providing an output force. The various parts of the piston have specific functions in order to achieve this result.

The head of the piston must be able to withstand the compressive force and temperature of combustion. Also the area adjacent the upper surface of the head forms a ring groove area where the piston rings are supported. These provide a sealing function with the cylinder bore so as to confine the combustion products.

The piston is also provided with pin bosses that receive the piston pin and which transmit the force from the piston to the connecting rod through the piston pin. Obviously, there are high forced transmissions in this area.

In addition, the piston as a skirt portion that rubs against the cylinder bore and which assists in maintaining the piston in an upright condition within the cylinder bore. In addition, the side thrusts on the piston are taken by the skirt and thus it is also subjected to forces and must have high abrasion resistance due to its rubbing action with the cylinder bore.

Thus, it should be apparent that the different parts of the piston have different functions that require optimally different materials. Of course, it is possible to form the entire piston from the same material but this can give rise to high costs and also high weights. It is important to reduce the weight of the piston so as to reduce the inertial loading on the engine and provide high power outputs and high engine crankshafts speeds. Also, the lighter the weight the lighter the balancing masses in the engine can be in order to reduce vibrations.

Some of these functions can be achieved by changing the dimensions of the piston either alone or in combustion with changing the materials. For example, the sealing function can be improved if the piston ring area is made greater and a greater number or greater size of piston rings are employed. However, this causes emission problems in that the area around the piston rings may retain combustion products and can cause some emission concerns.

Thus, there has been proposed the formation of pistons with different materials, each serving its intended purpose for the particular part of the piston in which it is positioned. However, this is quite a difficulty in adhering or connecting these different materials to each other to provide a unitary structure. Some more methods of connections can be employ brazing or welding. However, when applied with these additional heats in order to connect the materials together, then deterioration in the properties of the associated and affected materials can result thus defeating the main purpose of the composite construction.

It has also been proposed to improve the strength of the piston in certain areas by casting in inserts in the areas where stresses is highest. For example, it has been proposed to cast in inserts in the area of the piston pin bosses so as to increase their strength without adding significantly to the overall weight of the piston. However, this also has some of the same problems aforenoted in connection with using dissimilar materials. Furthermore, the casting process becomes somewhat complicated and thus this method does not totally solve the problem.

Forging is another technique by which composite materials may be used Some methods have been proposed, but they have not been totally successful in achieving the desired bonding strength. Therefore we have proposed a method and construction that employs a combination of powdered metal technology and forging bonding that can produce excellent results. This is disclosed in our co-pending application entitled "Piston For Internal Combustion Engine And Process Of Making Same", Ser. No. 08/859,536, Filed May 20, 1997 and assigned to the assignee hereof.

The materials utilized also are important not only to achieve the desired properties, but also the proper bond. Basically, pistons for engines are generally formed from aluminum or aluminum alloy materials. The aluminum has the advantage of light weight and relatively high strength. However, the use of alloy materials has been resorted to so as to improve certain characteristics.

For example, silicon (Si) in an alloy with the aluminum to increase abrasion resistance and resistance to hardening under temperature. Copper (Cu) and Magnesium (Mg) have also been employed for increasing strength. At times, however, these alloying elements can present some problems in that their inclusion in a casting process can cause difference in particle sizes to result which can offset some of the benefits of the alloying.

We have also proposed, therefore, a method of forming a piston material by a form of sintering process which then permits the forging of a piston to obtain the desired characteristics. Such an arrangement is disclosed in our co-pending application entitled "Piston For Internal Combustion Engine And Material Therefore", Ser. No. 09/022, 647, filed Feb. 12, 1998, and also assigned to the assignee hereof.

In accordance with the features hereof these materials are combined with lower costs materials to form a composite piston that will provide the performance desired along with lightweight and lower costs.

It is, therefore, a principal object to this invention to provide an improved piston construction for an internal combustion engine.

It is a further object to this invention to provide an improved, lightweight, high strength and high abrasion resistant, composite piston for a reciprocating machine.

It is a further object to this invention to provide an improved low cost piston having the desired material requirements in the various areas of the piston.

It is a further object to this invention to provide an improved method for manufacturing a composite piston of the aforenoted type.

SUMMARY OF THE INVENTION

First features of this invention are adapted to be embodied in a composite piston for a reciprocating machine comprised of a pair of dissimilar materials bonded together by a forging process. A first of the materials has a property having characteristics selected from the group of strength and abrasion resistance that is substantially greater than the other. The piston is comprised of a head portion having an upper surface adapted to experience pressure and a peripheral ring groove portion for receiving at least one sealing ring below the upper surface. A skirt portion comprised of at least a pair of surfaces for sliding engagement with a cylinder bore formed below said head portion. A pair of piston pin bosses having piston pin receiving openings for connection to a connecting rod small end by a piston pin is disposed below the ring groove. The piston pin bosses are formed between circumferentially spaced portions of the skirt portion surfaces.

In accordance with a first embodiment employed in a piston as described, the first material extends from the head portion to an area below the piston pin receiving openings.

In accordance with a second embodiment employed in a piston as described, the first material is formed from a powdered material that is comprised of aluminum alloyed with a material selected from the group of silicon (Si) and iron (Fe) having a particle diameter not greater than 10 μm.

Other features of this invention are adapted to be embodied in a method for forming a composite piston for a reciprocating machine as set forth above by a forging process. Blanks of the two materials are formed and then forged into the noted shape while, at the same time, bonding the two materials together.

In accordance with a first embodiment employed in a method as described, the first material is forged into a region that extends from the head portion to an area below the piston pin receiving openings.

In accordance with a second embodiment employed in a method as described, a blank of the first material is formed from a powdered material that is comprised of aluminum alloyed with a material selected from the group of silicon (Si) and iron (Fe) having a particle diameter not greater than 10 μm.

BRIEF DESCRIPTION OF THE DRAWINGS

FIG. 2 is a side elevational view of a composite piston constructed in accordance with a first embodiment of the invention.

FIG. 3 is a top plan view of the piston of this embodiment.

FIG. 4 is a cross sectional view taken along the line 4—4 of FIG. 3.

FIG. 5 is a developed view showing the exterior surface of the piston of this embodiment.

DETAILED DESCRIPTION OF THE PREFERRED EMBODIMENTS OF THE INVENTION

Figure 1:
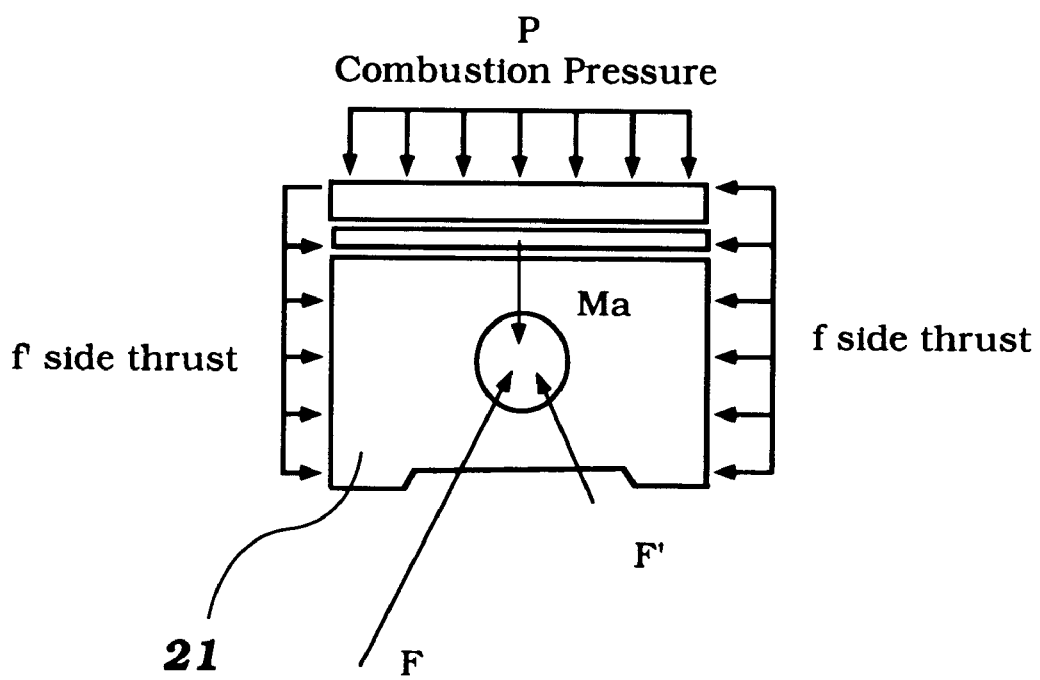
FIG. 1 is a side elevational view of a piston for a reciprocating machine showing how the various forces act upon the piston during engine operation to explain the need for different strengths and different material characteristics on varying parts of the piston.

To consider first the force loading on the piston to further amplify the varying loads and conditions as described in the Background portion of this application, reference may be had to FIG. 1. In this figure, a piston, identified by the reference numeral 21, is illustrated in a free body diagram form. During the down stroke of the piston when combustion pressure indicated at P occurs at the head of the piston 21, a force is exerted on the connecting rod.

Assuming that the engine is rotating at a counter clockwise direction as seen in this figure, the force between the piston and the connection rod will give a resultant force from the connecting rod back to the piston in the area of the piston pin boss indicating by the force vector F. When this occurs, the side of the piston that is engaged with the cylinder wall on the right hand side in this figure, will experience a reactive force or side thrust indicated by the vectors f acting to the left. In addition to these forces, there is a the thermal force generated by the burning gases on the head of the piston.

As the crankshaft rotates and the piston 21 reached bottom dead center, then the crankshaft will actually operated to drive the piston 21 back in an upward direction. Thus, the connection rod applies a force indicating by the force vector F' to the piston pin in the boss area which is reacted on by the mass Ma of the piston. This creates another reactive force side thrust with the cylinder bore on the opposite or left hand side of the piston of somewhat smaller magnitude as indicated by the vectors f'.

Hence, it should be seen that the skirt portions of the piston receive high side loading while the boss areas of the piston receive high loading acting primarily in normal directions to the piston pin axis but primarily on the upper or head side thereof.

In order to resist the sliding abrasion between the piston skirt and the cylinder wall it is desirable to have high abrasion resistance and, of course, high strength is also required in this area as well as in the area of the piston pin bosses, the ring area and the head area.

Therefore, in accordance with the invention and the embodiments now to be described, a composite construction is provided that will provide the required strength and abrasion resistance in certain areas of the piston while permitting the use of a lighter weight, lower cost materials in other areas. Also, the construction permits good bonding between the two dissimilar materials of the piston.

Referring now to the first embodiment and that shown in FIGS. 2–9, and initially primarily to FIGS. 2–5, a piston 21 constructed in accordance with this embodiment is illustrated. The piston 21 has a configuration which in external appearance is similar to most conventional pistons. This includes a head portion 22 from which a skirt portion 23 depends. The interior of the piston 21 in the area of the piston skirt 23 is formed with larger thickness material portions that form piston pin bosses 24.

The area above the piston pin bosses 24 forms a head portion in which piston ring grooves 25 are received. A piston pin 26 is received in bored openings in the piston pin bosses 24 to provide the connection to the associated connecting rod which is not shown.

In accordance with this embodiment of the invention, the body of the piston pin 21 is formed from two materials comprised of a first material indicated at 21A which is of a higher strength and higher abrasion resistance and which is alloyed in a manner to be described and which is formed also in a manner to be described.

Because of the alloying of the material 21A, it has a higher cost and higher weight than the remaining base piston material, indicated at 21B. The base piston material 21B may be also formed from a known lightweight and low cost material. In fact, lower cost materials may be employed then with conventional pistons because the material 21A takes the higher loading, in a manner which will be described.

As may be seen primarily from the developed view of FIG. 5, the skirt area 23 is formed so that the material 21A extends further toward the lower peripheral edge 27 of the piston skirt in the area between the piston pin bosses 24 then in the area of the piston pin bosses. This is because there is a higher skirt loading in these areas and abrasion resistance is required to be much higher in the area between the piston pin bosses then the area below them.

On the other hand, the material 21A also extends to a part of the top of the piston pin bosses 24 and has a much thicker wall area in this portion as seen by the right hand side of FIG. 4. This is to provide the requisite strength in the piston pin groove area 25 and also to carry on this material so that it is in the upper area of the piston pin bosses where the piston pins 26 are received so as to take part of the loading when the piston is being driven downwardly from the expansion of the gases.

The material by which the piston portion 21A is formed is made as set forth in the aforenoted co-pending application, Ser. No. 09/022,647. However, that method will be described again in detail here.

First, a powered metal is formed having the desired chemical constituents and alloying to be employed in the finished surface portion of the piston. This is done by first forming an ingot from which the powered metal is to be formed which will be compressed then into a sintered state to form the blank from which the piston portion is forged.

The ingot is formed from an alloy of aluminum and certain alloying materials which are added to improve strength, abrasion resistance and resistance to deterioration under heat. Basically, this ingot is formed from an aluminum alloy that consists of aluminum (Al) as a base material and certain alloying materials such as silicon (Si), iron (Fe), and other materials as will be noted. As will become apparent as this description proceeds, the ingot is subsequently converted into a metal powder state which is subsequently heated and extruded to form blanks from which the piston portion 21A is forged.

Certain of these alloying materials may not be included directly in the ingot but may be formed as separate powders which are then mixed with the ingot powder during the extrusion and heating step that forms the formed metal blanks for forging. As will be described below, silicon carbide (SiC) is one of such materials that may be seperately mixed with the powder formed from the ingot.

EXAMPLE 1

A first example of the material from which the ingot may be formed includes as alloying materials to the base aluminum (Al) the following alloying elements:

| | |
|---|---|
| silicon (Si) | 10–22% by weight |
| iron (Fe) | 1–10% by weight |
| copper (Cu) | 0.5–5% by weight |
| magnesium (Mg) | 0.5–5% by weight |
| manganese (Mn) | 1% or less by weight |
| nickel (Ni) | 1% or less by weight |
| chromium (Cr) | 1% or less by weight |
| zirconium (Zr) | 2% or less by weight |
| molybdenum (Mo) | 1% or less by weight |

The silicon alloying material improves abrasion resistance and resistance to cracking or breaking and is in the form of hard primary crystals or eutectic crystals in the metal texture. Iron is added to obtain high strength at temperatures of 200° C. or more and by disbursing and strengthening the metal texture. Copper and magnesium are added to improve the strength at temperatures less than 200° C. It has been found that amounts greater than outside the ranges specified may fail to obtain the desired abrasion resistance and strength at the varying temperatures.

EXAMPLE 2

A specific example of alloying material that falls within the range of Example 1 and which is preferred is as follows:

| | |
|---|---|
| silicon (Si) | 17% |
| iron (Fe) | 5% by weight |
| copper (Cu) | 1% by weight |
| magnesium (Mg) | 5% by weight |
| manganese (Mn) | 0.01% by weight |
| nickel (Ni) | 0.01% by weight |
| chromium (Cr) | 0.01% by weight |
| zirconium (Zr) | 1% by weight |
| molybdenum (Mo) | 0.01% by weight |

EXAMPLE 3

Another range of embodiment of alloy that can be employed in connection with the invention employs Silicon carbide (SiC) as an alloying material and has the following alloying elements:

| | |
|---|---|
| silicon (Si) | 10–22% by weight |
| iron (Fe) | 1–10% by weight |
| copper (Cu) | 0.5–5% by weight |
| magnesium (Mg) | 0.5–5% by weight |
| manganese (Mn) | 1% or less by weight |
| nickel (Ni) | 1% or less by weight |
| chromium (Cr) | 1% or less by weight |
| zirconium (Zr) | 2% or less by weight |
| molybdenum (Mo) | 1% or less by weight |
| silicon carbide (SiC) | 1–10% by weight |

EXAMPLE 4

A specific preferred embodiment employing silicon carbide as an alloying agent and falling within the range of Example 3 includes the following components:

| | |
|---|---|
| silicon (Si) | 17% by weight |
| iron (Fe) | 5% by weight |
| copper (Cu) | 1% by weight |
| magnesium (Mg) | 0.5% by weight |
| manganese (Mn) | 0.01% by weight |
| nickel (Ni) | 0.01% by weight |
| chromium (Cr) | 0.01% by weight |
| zirconium (Zr) | 1% by weight |
| molybdenum (Mo) | 0.01% by weight |
| silicon carbide (SiC) | 5% by weight |

In addition to silicon carbide, other materials such as aluminum oxide ($Al_2O_3$) or aluminum nitride (AlN) may be substituted to improve abrasion resistance in the amounts specified in Examples 3 and 4, i.e. 1–10% or specifically 5%.

It has been found that the crystalline size of certain of the alloying materials is important in obtaining the desired abrasion resistance, resistance to cracking and high fatigue strength. For example, the initial crystalline silicon particle diameter should be not greater than 10 µm. Also, the average particle diameter of the iron should be not greater than 10 µm. Where as has been previously noted, these alloying materials may be either incorporated in the ingot from which the powder is formed or may be formed from separate particles that are molded into the pellet through mixing with the particles formed from the primary aluminum alloy. Either method can be employed so long as the resulting crystalline particle size is within the range set forth.

In the examples given as Example 3 and Example 4 it is particularly advantageous to add the silicon carbide (SiC) as a separate powder mixed with the powder from the ingot before solidifying. If this is done the particle size of the silicon carbide (SiC) powder before mixing should preferably be 5µm.

The particles are formed by melting the ingot from the alloy and the base materials at a temperature of 700° C. or more. This molten material is then sprayed like a fog and rapidly cooled to solidify at a cooling rate of at least 100° C. per second thereby obtaining a rapidly solidified powder metal of the aluminum alloy. It has been found that good results can be obtained when the specific particle size of the wear-resistant material such as the silicon carbide has a diameter of 5 µm. As has been noted, this is particularly useful when the particles are formed separately and combined in the next step which will be described.

Figure 7:
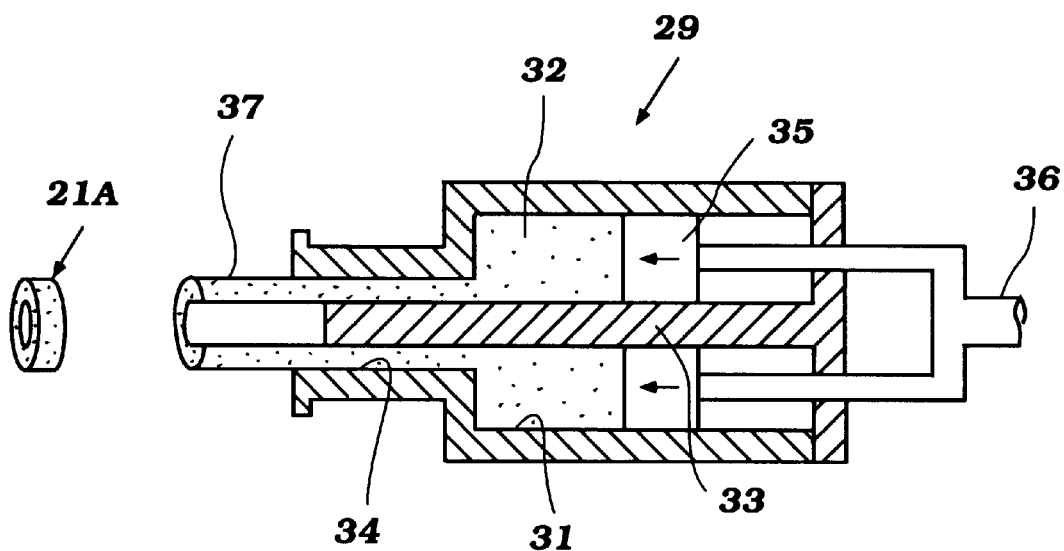
FIG. 7 is a partially exploded, in part, perspective view showing how one of the blanks for the forging process is formed.

After the power has been formed in the manner aforedescribed, then it is sintered into a blank from which the final forged piston 21 will be formed. The part 21A is formed in an annular blank as shown in FIG. 7 where the process by which it is formed is illustrated.

Figure 6:
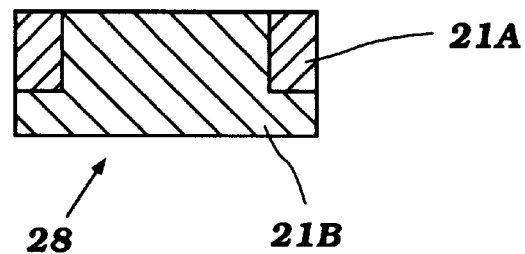
FIG. 6 is a cross sectional view showing a forging blank that is utilized in connection with the formation of the piston of this embodiment.

This annular blank, also indicated by the reference numeral 21A, is then slipped over another blank, which also be formed by a powered sintering process or by casting or any other process so as to result in a forging blank having a configuration as shown in FIG. 6 and which is identified in this figure by the reference numeral 28.

The material for the piston portion 21B may be an aluminum alloy conventionally used for casting as a melt production-type (continuous casting material) such as an aluminum alloy of a melt production-type containing aluminum (Al) as a base material. This may be alloyed with 10–22% by weight of silicon (Si), 1% by weight or less of iron (Fe), 0.5–5% by weight of copper (Cu), 0.5–2% by weight of magnesium (Mg), 1% by weight or less of manganese (Mn), 1% by weight or less of nickel (Ni) and 1% by weight or less of chromium (Cr).

One specific example of such a material is an aluminum alloy of the melt production-type containing 19% by weight of silicon (Si), 0.2% by weight of iron (Fe), 4% by weight of copper (Cu), 1% by weight of magnesium (Mg), 0.1% by weight of manganese (Mn), 0.1% by weight of nickel (Ni) and 0.1% by weight of chromium (Cr).

The sintered blank of the material 21A is then formed by an extruding process utilizing an apparatus as shown in FIG. 7. Basically, the powder is heated and extruded under pressure at a temperature of less than 700° C. and preferably in the range of 400 to 500° C. into a hollow cylinder. The apparatus by which this is done is illustrated, as has been noted in FIG. 7, and will now be described by particular reference to that figure.

The apparatus is indicated generally by the reference numeral 29 and includes an extruding cylinder having a bore 31 in which the powder, indicated at 32 is charged. A fixed core rod 33 extends through the end of the cylinder 31 and through a smaller diameter extruding passage 34.

An annular piston 35 is mounted within the bore 31 and has an extending portion 36 that is engaged by a ram for extruding the powder through the portion 34 which it solidifies and results in the formation of a hollow cylindrical extrusion 37. This extrusion is then cut off at the desired lengths to provide the blank portions 21A.

These portions are then slipped over the smaller diameter portion of the blank 21B so as to provide the configuration as shown in FIG. 6 which forms the final forging blank.

Figure 8:
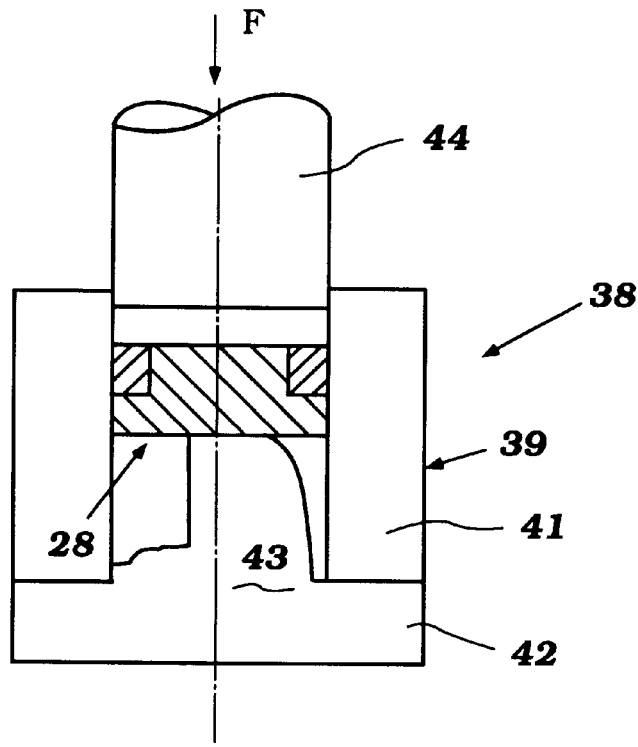
FIG. 8 is a view showing the blank of FIG. 6 in the forging apparatus before the forging has commenced.
Figure 9:
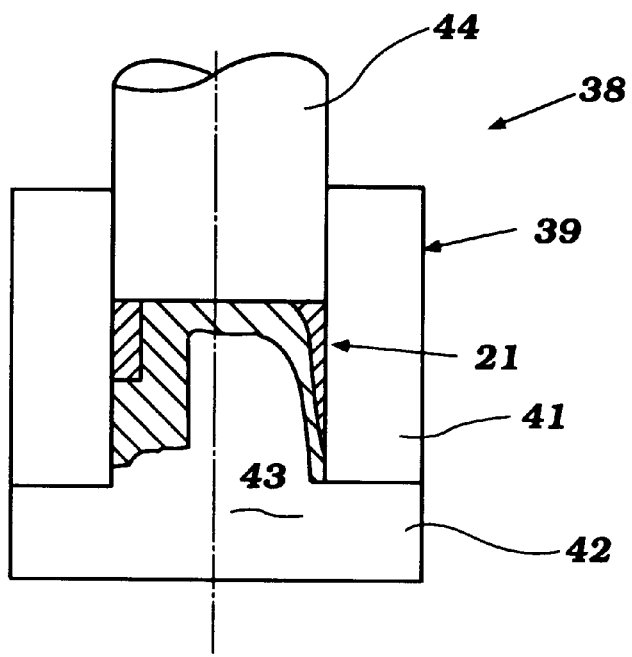
FIG. 9 is a cross sectional view, in part similar to FIG. 8, and shows the completion of the forging operation.

After the blank 28 is formed, it is then placed in the forging apparatus shown in FIGS. 8 and 9 and which forging apparatus is indicated generally by the reference numeral 38. This forging apparatus 38 includes a female die 39 comprised of a cylindrical body portion 41 closed by an end plate 42. The end plate 42 has a projecting portion 43 which defines the interior of the cavity of the piston.

It should be noted that the sections of FIGS. 8 and 9 is taken along the same plane as FIG. 4 so that the piston shape can be compared although the sides are reversed in this figure.

The blank 28 may be coated with a release material and also may be heated to bring it up to a temperature less than 700° C. and preferably in the range of 400 to 500° C. A ram 44 is then pressed into the forging dye 39 to the position shown in FIG. 9 wherein the final formation of the piston is formed. Preferably, the die 39 and forging press 44 are also brought up to a temperature less than 700° C. and then in the range of 400 to 500° C. If this is done, the blank 28 need not be heated but can be left in the dies for a time period until it reaches this temperature.

After the forging has been completed, then finished machining, heat treating and other machining steps can be formed. This can include the cutting of the ring grooves, final honing of the piston pin holes and any other finish machining and surface treatment as may be desired.

During the forging process, any surface oxides of the material of either of the blank materials 21A or 21B will be destroyed by the friction of the forging process thus improving the bond between the materials. This further increases the strength of the resulting piston.

The surface properties of the resulting piston and particularly the specific areas of the piston comprised of the materials 21A and 21B will now be described by references to FIGS. 10 and 11. In these figures, the characteristics of Examples 2 and 4 above are compared as materials A2 and A4 with an example of a conventional piston material identified at B. Basically, the difference between Materials 2 and 4 is that Material 2 has no silicone carbide while Material 4 is alloyed with silicone carbide. Except for this difference, the constituents of the two alloys are the same.

Figure 10:
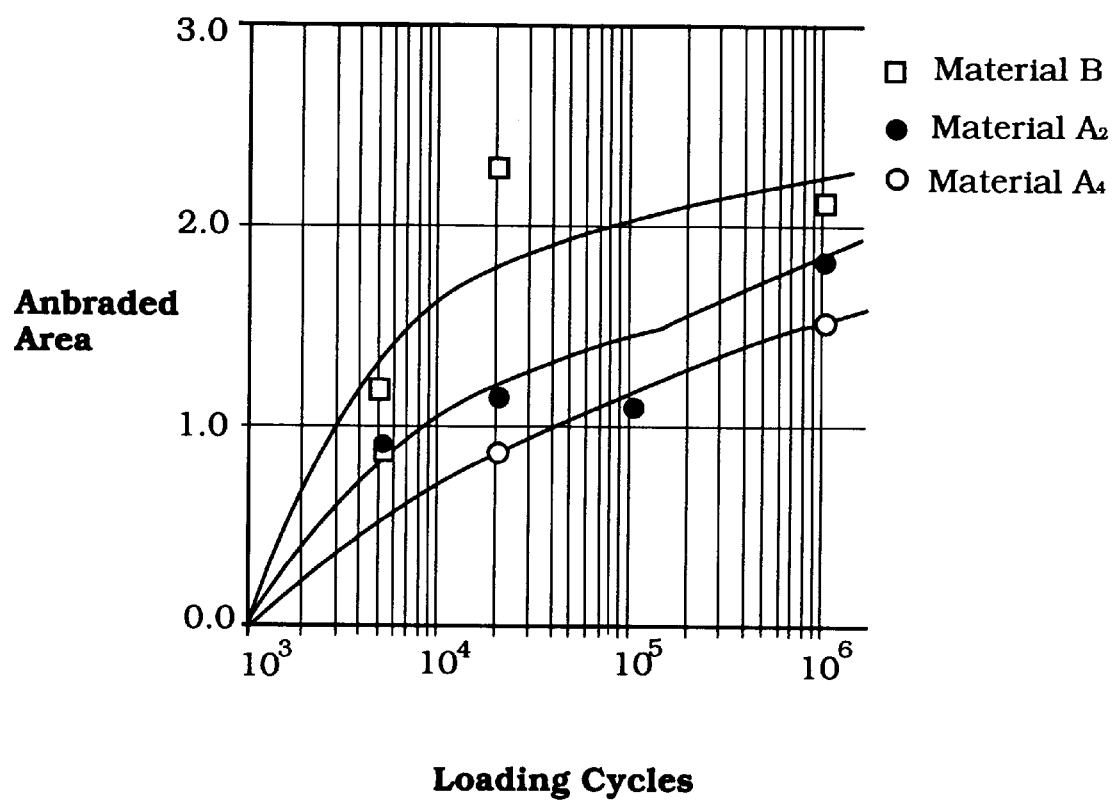
FIG. 10 is a graphical view showing the abrasion resistance for different materials.

FIG. 10 shows the results of a conventional fretting type abrasion test. This is done by repeatedly scuffing the material. This is done at a temperature of 250° C. The greater the area of abrasion marks, the less the abrasion resistance. It will be seen that the two alloy materials in accordance with the invention, i.e. Materials A2 and A4, have much greater abrasion resistance then the conventional piston material B. As a result, the areas that are subject to abrasion are formed with this surface and the remaining area of the piston can be made from the lighter weight, less expensive material.

Figure 11:
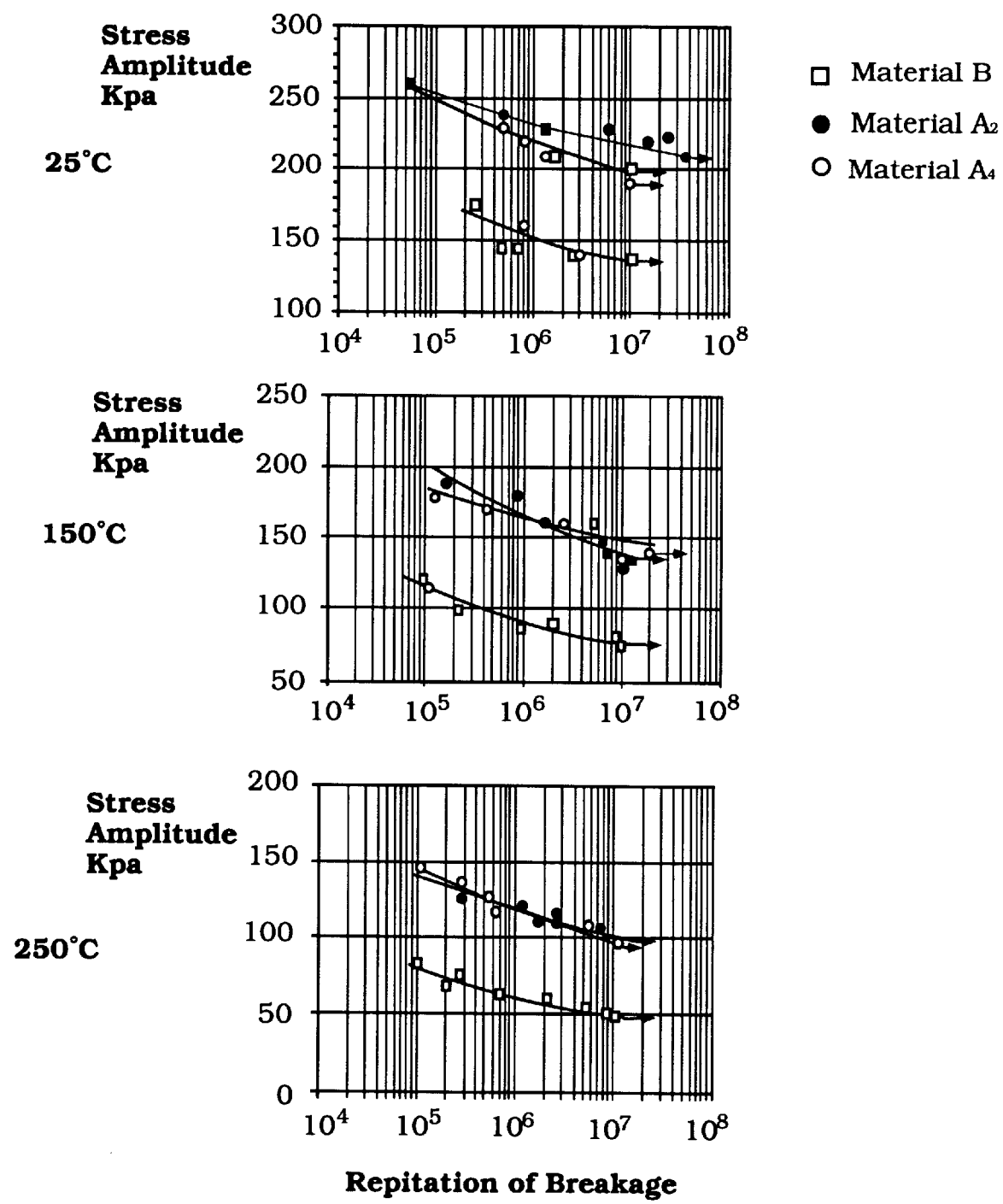
FIG. 11 is a graphical view showing the fatigue strength of certain materials at varying operating temperatures.

FIG. 11 shows the fatigues strengths of the same respective materials. It will be seen that the fatigue strength at various temperatures is much greater for the materials in accordance with the invention then the conventional material which is used for the base of the piston. Hence, by utilizing this method it is possible to improve the piston performance while not increasing significantly its weight or cost.

FIGS. 12–18 show another embodiment which differs from the previous embodiment in two regards. The first is the relative area of the piston 21 which is formed from the two materials 21A and 21B and the second, is how the blank is formed from which the piston is formed.

Figure 12:
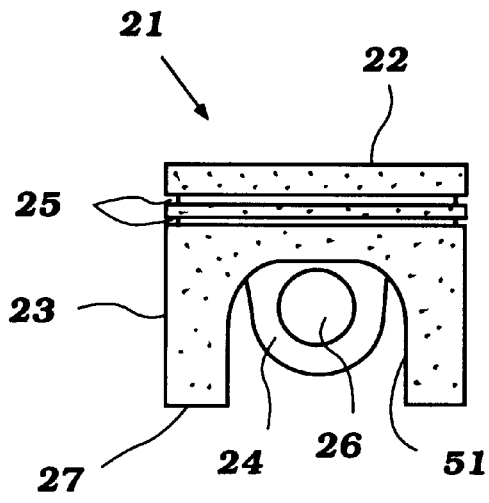
FIG. 12 is a side elevational view, in part similar to FIG. 2, and shows another embodiment of composite piston.
Figure 13:
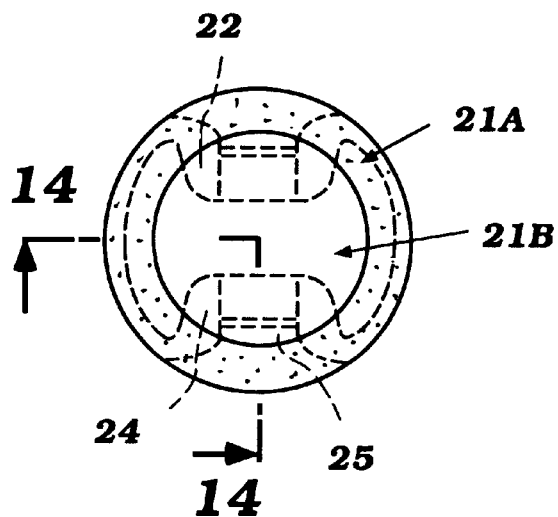
FIG. 13 is a top plan view of the piston of this embodiment.
Figure 14:
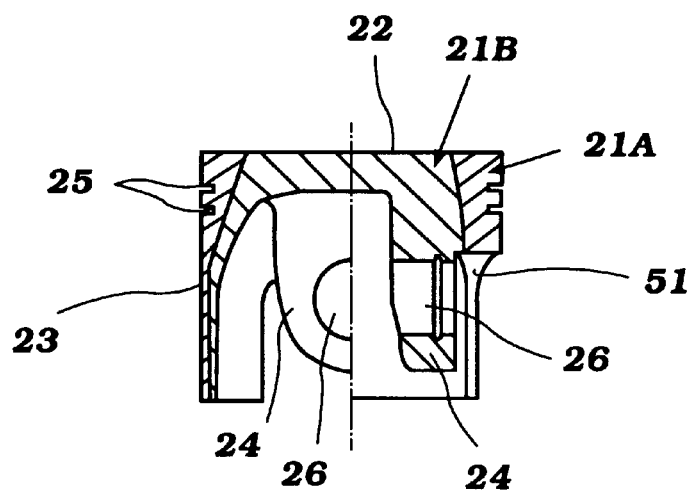
FIG. 14 is a cross sectional view taken along the line 14—14 of FIG. 13.

Referring first to FIGS. 12–14, it should be noted that the general shape of the piston is substantially the same as the previously described embodiment and hence the same reference characters have been applied. However, with this embodiment further lightening and the weight without sacrifice of strength is made possible by leaving the area of the skirt around the piston pin bosses 24 generally open as seen in FIGS. 12 and 14. This open area is indicated at 51.

Thus, the piston pin bosses 24 are formed completely by the piston material 21B. Aside from this, the construction is generally the same and in the area where the skirts 23 are formed, the material 21A is still backed up by the material 21B. This permits the wear surface to be obtained without necessitating the higher strength. A thin wall construction is possible because of the back up of the lighter weight less strong material.

Figure 15:
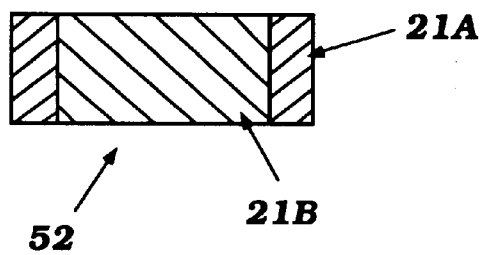
FIG. 15 is a cross sectional view showing the forging blank employed for manufacturing the piston shown in FIGS. 12–14.
Figure 16:
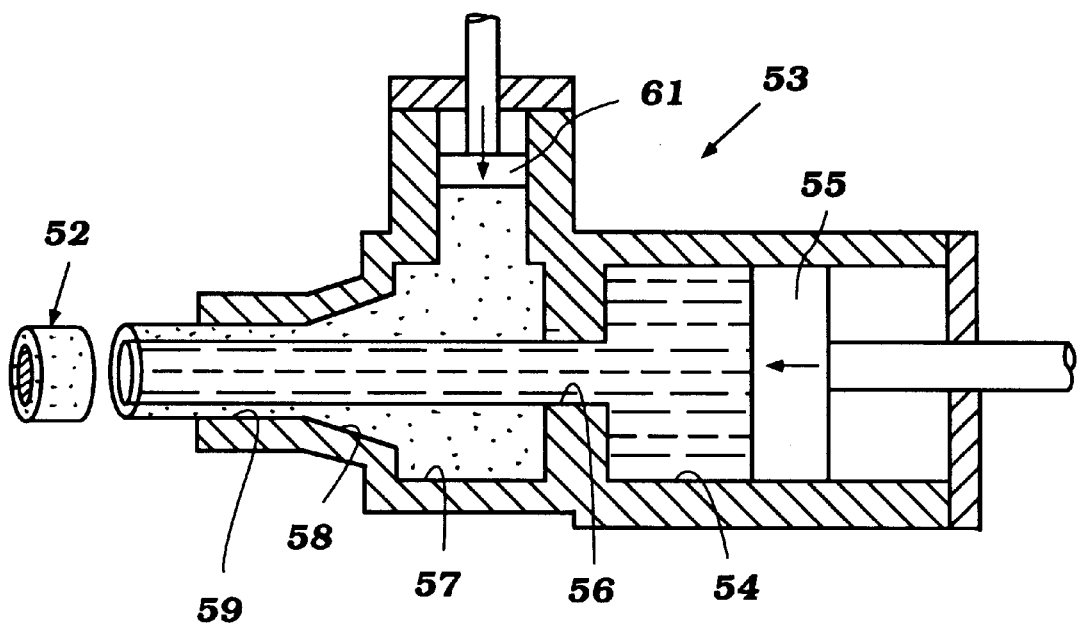
FIG. 16 is a partially exploded, partially perspective view showing the apparatus for forming the blank shown in FIG. 15.

This embodiment is also formed using a blank which differs from the previous blanks and which is shown in FIG. 15 and identified by the reference numeral 52. The blank 52 is formed by the apparatus shown in FIG. 16. This apparatus includes an extruding mechanism of the type in the previously described embodiment for extruding the portion 21A of the blank 52.

However, in this embodiment the portion 21B is also formed simultaneously by an extrusion process. Hence, the extruding apparatus, indicated generally by the reference numeral 53 includes a first cylindrical chamber 54 wherein a blank of the material which is to form the blank portion 21 B is contained. This is heated to a temperature in the range of 400° C. to 500° C. A piston 55 acts to compress this material and extrude it in a solid form through a restricted opening 56. Thus, there will be a solid core formed around which the piston material 21A is extruded.

Thus, the core that is formed is extruded into a chamber 57. This chamber 57 has a tapering portion 58 that leads to an extruding portion 59.

One or more side pistons 61 compresses the metal particles of the material 21A in the chamber 57 and extrudes them through the openings 58 and 59 so that a composite blank 52 is formed. This blank 52 will thus not only facilitate the extrusion, but also will permit some initial bonding of the material.

Figure 17:
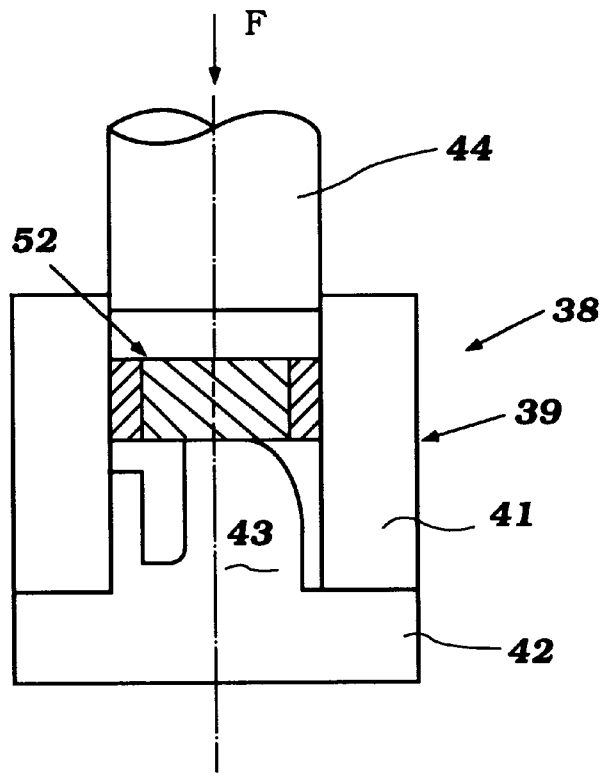
FIG. 17 is a cross sectional view of a forging apparatus showing the blank when initially inserted and before the forging has begun.
Figure 18:
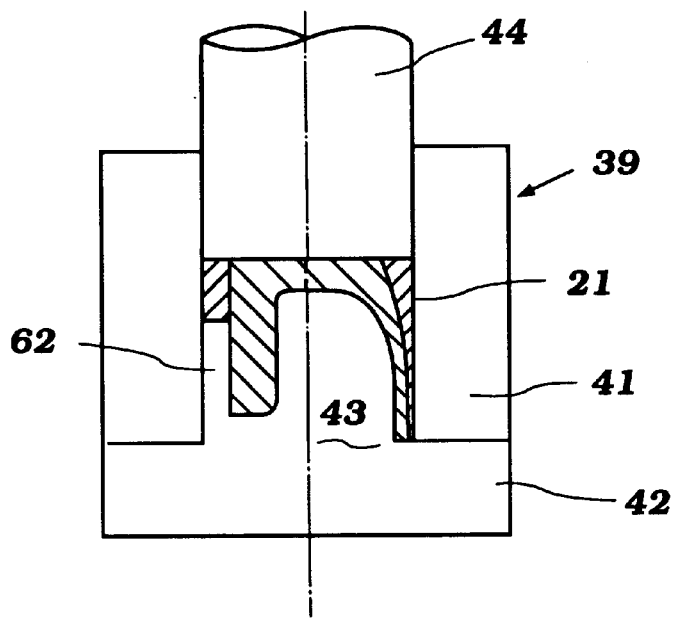
FIG. 18 is a cross sectional view, in part similar to FIG. 17, and shows the completion of the forging step for this embodiment.

The piston is then forged from this blank in the manner previously described and using the same type of apparatus as shown in FIGS. 17 and 18. Because the construction is otherwise the same, further description of these figures is not believed to be necessary.

However, it should be noted that the base portion 42 of the die 39 also has upwardly extending parts 62 which extend in the areas where the piston pin bosses 24 are exposed so that no material 21A will cover the bosses 24 as again seen in FIG. 12.

Thus, from the forgoing description, it should be readily apparent that the described constructions and methodology permits the formation of lightweight pistons having the appropriate surface properties and metal characteristics without significant increase in weight and/or cost. Of course, the foregoing description is that of preferred embodiments of the invention, and various changes and modifications can be made without departing from the spirit and scope of the invention, as defined by the appended claims.

What is claimed is:

1. A composite piston for a reciprocating machine comprised of a pair of dissimilar materials bonded together by a forging process, one of said materials having a property having characteristics selected from the group of strength and abrasion resistance that is substantially greater than that of the other of said materials, said piston being comprised of a head portion having an upper surface adapted to experience pressure and a peripheral ring groove portion for receiving at least one sealing ring below said upper surface, a skirt portion comprised of at least a pair of surfaces for sliding engagement with a cylinder bore formed below said head portion, and a pair of piston pin bosses having piston pin receiving openings for connection to a connecting rod small end by a piston pin, said piston pin bosses being formed between circumferentially spaced portions of said skirt portion surfaces, said first material formiing at least a portion of the outer surface of said piston in an area extending from the top part of said head portion to an area below the upper edges of said piston pin receiving openings around the complete circumference of said piston.

2. A composite piston for a reciprocating machine as set forth in claim 1, wherein the one material forms substantially the entire piston ring groove portion.

3. A composite piston for a reciprocating machine as set forth in claim 1, wherein the one material forms at least a part of the pair of surfaces of the skirt portion.

4. A composite piston for a reciprocating machine as set forth in claim 3, wherein the one material also forms at least a part of the ring groove portion.

5. A composite piston for a reciprocating machine as set forth in claim 4, wherein at least the central portion of the upper surface is formed from the other of the materials.

6. A composite piston for a reciprocating machine as set forth in claim 3, wherein at least a portion of the one material that forms the part of the pair of surfaces is backed up by the other material.

7. A composite piston for a reciprocating machine as set forth in claim 6, wherein the one material also forms a portion of the piston pin boss portion.

8. A composite piston for a reciprocating machine as set forth in claim 7, wherein the one material also forms at least a part of the ring groove portion.

9. A composite piston for a reciprocating machine as set forth in claim 8, wherein at least the central portion of the upper surface is formed from the other of the materials.

10. A composite piston for a reciprocating machine as set forth in claim 3, wherein at least the lower portion of the pair of surfaces of the skirt portion are formed by the other material.

11. A composite piston for a reciprocating machine as set forth in claim 1, wherein the one material forms the entire upper surface of the head portion.

12. A composite piston for a reciprocating machine as set forth in claim 11, wherein the one material also forms the ring groove portion.

13. A composite piston for a reciprocating machine as set forth in claim 12, wherein the one material forms at least a portion of the skirt portion.

14. A composite piston for a reciprocating machine as set forth in claim 13, wherein the one material forms the entire outer surface of the skirt portion.

15. A composite piston for a reciprocating machine as set forth in claim 14, wherein the one material forms none of the boss portions.

16. A composite piston for a reciprocating machine as set forth in claim 1, wherein the one material is comprised of aluminum alloyed with a material selected from the group of silicon (Si) and iron (Fe) having a particle diameter not greater than 10 μm.

17. A composite piston for a reciprocating machine as set forth in claim 16 wherein the alloying material comprises silicon (Si).

18. A composite piston for a reciprocating machine as set forth in claim 17 wherein the silicon (Si) is in an amount of 10–22% by weight of the alloy.

19. A composite piston for a reciprocating machine as set forth in claim 16 wherein the alloying material comprises iron (Fe).

20. A composite piston for a reciprocating machine as set forth in claim 19 wherein the iron (Fe) is in an amount of 1–10% by weight of the alloy.

21. A composite piston for a reciprocating machine as set forth in claim 19 wherein the alloying material also comprises silicon (Si).

22. A composite piston for a reciprocating machine as set forth in claim 21 wherein the silicon (Si) is in an amount of 10–22% by weight of the alloy.

23. A composite piston for a reciprocating machine as set forth in claim 21 wherein the iron (Fe) is in an amount of 1–10% by weight of the alloy.

24. A composite piston for a reciprocating machine as set forth in claim 23 wherein the silicon (Si) is in an amount of 10–22% by weight of the alloy.

25. A composite piston for a reciprocating machine as set forth in claim 16 wherein the alloying material also comprises a material harder than silicon (Si).

26. A composite piston for a reciprocating machine as set forth in claim 25 wherein the alloying material harder than silicon (Si) is selected from the group comprised of silicon carbide (SiC), aluminum oxide ($Al_2O_3$) and aluminum nitride (AlN).

27. A composite piston for a reciprocating machine as set forth in claim 26 wherein the amount of alloying material from the group comprised of silicon carbide (SiC), aluminum oxide($Al_2O_3$) and aluminum nitride (AlN) is in the range of 1–10% by weight of the alloy.

* * * * *

UNITED STATES PATENT AND TRADEMARK OFFICE
CERTIFICATE OF CORRECTION

PATENT NO.    : 6,032,570
DATED         : March 7, 2000
INVENTOR(S)   : Koike et al.

Page 1 of 1

It is certified that error appears in the above-identified patent and that said Letters Patent is hereby corrected as shown below:

<u>Column 10,</u>
Line 44, please delete " formiing" and replace with -- forming --

Signed and Sealed this

Twenty-first Day of January, 2003

JAMES E. ROGAN
*Director of the United States Patent and Trademark Office*